Patented Nov. 13, 1928.

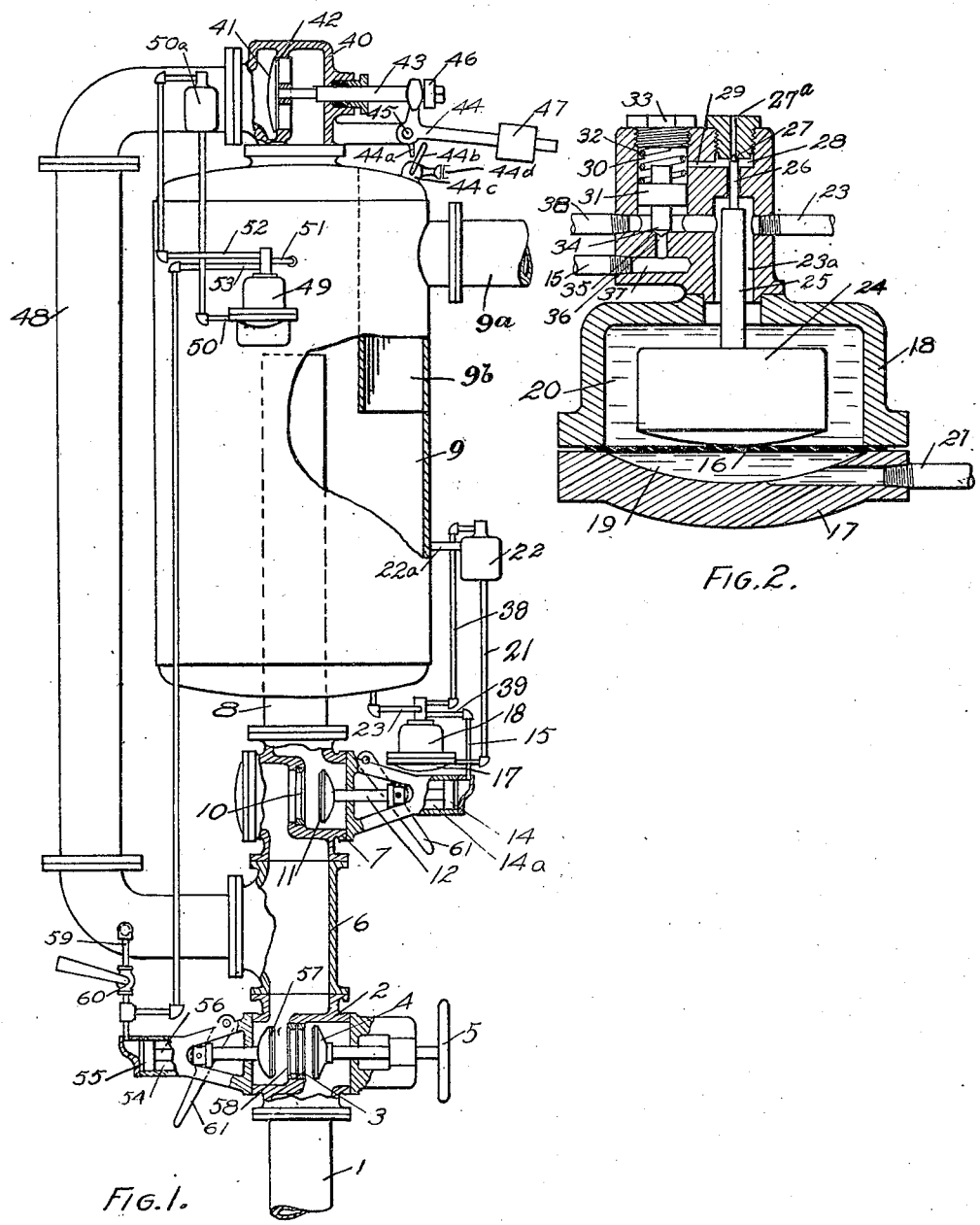

1,691,630

UNITED STATES PATENT OFFICE.

OSCAR H. LUDEMAN, OF GLEN RIDGE, NEW JERSEY, ASSIGNOR TO LUDEMAN BROTHERS INCORPORATED, OF NEW YORK, N. Y., A CORPORATION OF NEW YORK.

SAFETY STOP MECHANISM.

Application filed February 17, 1926. Serial No. 88,972.

This invention is designed to afford safety against the accumulation of water in steam lines, particularly steam lines leading to steam engines. Such accumulations of water are very destructive to such apparatus and means have heretofore been provided for automatically shutting off the steam upon an accumulation of water so as to prevent damage to the apparatus from such accumulation. In the case of steam engines particularly, it is desirable after such an accumulation of water as would ordinarily be stopped by a safety device so as to prevent injury to the engine to continue the operation of the engine until the accumulation of water can be removed and the engine continued in its normal manner. This is particularly so where the stoppage of the engine results in great inconvenience, as for instance where it is driving lighting plants and similar equipment. The present invention is designed to permit of the continued operation of an engine, or apparatus receiving steam after the preliminary closing of the supply pipe due to a destructive accumulation of water. Features and details of the invention will appear from the specification and claims.

The invention is illustrated in the accompanying drawings as follows:—

Fig. 1 shows a side elevation of the device, partly in section.

Fig. 2 an enlarged section of the apparatus responding to accumulations of water.

1 marks the steam supply pipe, 2 the ordinary throttle valve having a seat 3, 4 a head, 5 an operating handle, 6 a T, and 7 a primary safety valve which is connected by a pipe 8 with a separator chamber 9. Steam is delivered to the separator chamber through a pipe $9^a$ from any suitable source of supply and strikes a baffle plate $9^b$. The pipe 8 is preferably carried up into the chamber 9 above the bottom of the baffle plate $9^b$. The safety valve has a seat 10, an operating head 11, a stem 12 extending from the head, a piston 14 operating on the stem, and $14^a$ a cylinder in which the piston operates, the cylinder being connected by a pipe 15 with the water-pressure controlled mechanism.

The water pressure controlled mechanism is of the diaphragm type having a diaphragm 16 which is secured between plates 17 and 18 forming chambers 19 and 20. The chamber 19 is connected by a pipe 21 with a small chamber 22 connected with the separator by a pipe $22^a$. Water accumulates in this pipe up to the level of the pipe $22^a$ and forms a static head operating on the underside of the diaphragm. A pipe 23 leads from the lower end of the separator chamber to a chamber $23^a$ connected with the chamber 20. A weight 24 is arranged in the chamber 20 resting on the diaphragm and has the upwardly extending stem 25 projecting through the chamber $23^a$. A projecting stem 26 having a valve 27 on its upper end controlling an escape passage $27^a$ leads from a small chamber 28. The chamber 28 is connected by a passage 29 with a chamber 30. A plunger 31 is arranged in the chamber 30 and is subject to the pressure of a spring 32 operating against a closure plug 33. A valve 34 is carried by the plunger 31 and operates on a seat 35. The valve controls a passage 36 connecting the chamber 30 with a chamber 37. A pipe 38 leads from the small chamber 22, or the steam space of the separator to the chamber 37 below the plunger and as the plunger opens is put in communication with the pipe 15 leading from the chamber 37 to the cylinder $14^a$. The pipe 39 leads to the cylinder $14^a$ and upon pressure being delivered to the cylinder $14^a$ the head 11 is forced to its seat thus closing the passage. This water-controlled mechanism is in general described in my application, No. 4881, filed Jan. 26th, 1925. The scheme of operation is as follows: The pipe 21 communicating with the chamber 19 if not originally filled with water soon becomes filled with water and makes a constant static head on the bottom of the diaphragm 16 and this without a corresponding pressure on the opposite side of the diaphragm overcomes the weight and closes the valve 27. The pipe 23 extends to the lower part of the separator 9 and is subject to the varying head incident to the variation of level in the separator. If there is no accumulation of water in the separator the head is negligible but if water builds up the head builds up until this head with the weight 24 overcomes the head under the diaphragm 16 and when this happens the weight 24 drops down opening the valve 27. This immediately permits of an exhaust through the passage $27^a$ and 29 from the cylinder 30. The pipe 38 is connected with the separator by way of the pipe $22^a$, chamber 22 and is, therefore, subject to separator pressure and this pressure is sufficient operating on the under side of the plunger 31 to overcome the spring 32 when the pressure is relieved above the piston. Immediately, therefore, when there is an accumulation in the separator and the opening of the valve 27, as above described, there follows the opening of the valve 34 by reason of the release of pressure above the piston 31. When the valve 34 opens, it immediately puts the passage 37 and pipe 15 in communication with the separator through the pipe 38 and also through the pipe 23 so that full separator pressure is delivered to the cylinder 14ª and this pressure operating on the piston 14 closes the safety valve 11.

A valve fitting 40 is arranged on the upper end of the separator and a valve head 41 is arranged in the valve body operating on a seat 42. The valve head is provided with a stem 43. A bell crank lever 44 is pivotally mounted on a post 45 extending from the valve body 40. One arm of the bell crank operates against a shoulder 46 on the stem 43. The opposite arm of the bell crank carries a weight 47. The valve 41, therefore, is yieldingly held to its seat so long as the safety valve 7 is open. When, however, the safety valve 7 closes the valve head is forced from its seat by the steam pressure permitting steam to pass from the valve body by way of a bypass 48 to the T 6 and thence by the throttle valve. This supplies the flow of steam for the engine, or other apparatus.

It is desirable to sound an alarm device when the first safety valve is closed. An arm 44ª is mounted on the bell crank lever 44. A handle 44ᵇ of a valve 44ᶜ is in the path of the arm 44ª so as to be actuated when the bell crank is thrown through the movement of the valve head 41. A whistle 44ᵈ is put in communication with the separator by the action of the valve 44ᶜ so that when the primary safety valve 7 is closed the whistle is sounded.

It is desirable to provide a secondary closure, or final safety closure provided an unusual accumulation of water should fill the separator tank and otherwise be carried to the engine. This is accomplished by providing a water-sensitive controlled mechanism, similar to that shown in Fig. 2 at 49. This is connected by the pipe 50 with a small tank 50ª connected with the steam pipe 48 above the separator and corresponding to the pipe 21. It is also provided with a pipe 51 leading from the desired upper level of the separator and corresponds to the pipe 23. It is also supplied with pipes 52 and 53 which correspond to the pipes 38 and 39. The pipe 52 leads from the small chamber 50ª as the pipe 38 leads from the small chamber 22. The pipe 53 leads to the cylinder 54 which is provided with a piston 55. The piston acts on a stem 56 carrying the safety valve head 57 which safety valve head operates on a seat 58. When, therefore, the water-controlled apparatus is actuated and fluid pressure is delivered to the pipe 53 the valve head 57 is closed, thus finally closing off the engine. It will, therefore, be seen that the water controlled apparatus operating from the bottom of the separator actuates the safety valve 11 and from this on the steam is delivered through the bypass. If the water continues to accumulate in the separator and finally rises above the pipe 51, this pipe corresponding to the pipe 23, thus putting a head on the diaphragm corresponding to the diaphragm 16 this water controlled apparatus operates opening the valve 27 and releasing pressure to the pipe 53 finally closing the valve 57 and shutting down the engine.

A bypass 59 leads from the pipe 48 to the cylinder 54 and is controlled by a valve 60 by means of which the valve head 57 may be manually controlled, if desired. Levers 61 are arranged adjacent to the stems 12 and 56 by means of which the valve heads 11 and 57 may be also manually controlled.

What I claim as new is:—

1. In a safety stop mechanism, the combination of a steam supply pipe; a safety valve in the supply pipe; means responsive to water accumulations controlling said valve; and a bypass around said safety valve, the bypass leading from a higher level than the passage through the safety valve.

2. In a safety stop mechanism, the combination of a steam supply pipe; a safety valve in the supply pipe; means responsive to water accumulations controlling said valve; a bypass around said safety valve, the bypass leading from a higher level than the passage through the safety valve; and a throttle valve controlling the passage of steam leading from the bypass.

3. In a safety stop mechanism, the combination of a steam supply pipe; a primary safety valve in the supply pipe; means responsive to water accumulations controlling said valve; a bypass around said primary safety valve; a secondary safety valve controlling the passage through the bypass; and devices responsive to accumulations of water controlling said secondary safety valve.

4. In a safety stop mechanism, the combination of a steam supply pipe; a primary safety valve in the supply pipe; means responsive to water accumulations controlling said valve; a bypass around said primary safety valve; a valve normally closing the bypass opening when the primary valve opens; a secondary safety valve controlling the passage through the bypass; and devices responsive to accumulations of water controlling said secondary safety valve.

5. In a safety stop mechanism, the combination of a steam supply pipe; a safety valve in the supply pipe; means responsive to water accumulations controlling said valve; a bypass around said safety valve, the bypass leading from a higher level than the passage through the safety valve; an alarm device; and means controlling the alarm device actuated with the closure of the safety valve.

6. In a safety stop mechanism, the combination of a steam supply pipe; a separator tank in the steam supply pipe; a primary safety valve in the supply pipe; means responsive to water accumulations in the separator controlling said valve; a bypass around said primary safety valve; a secondary safety valve controlling the passage of steam through the bypass; and devices responsive to an added accumulation of water in the separator chamber controlling said secondary safety valve.

In testimony whereof I have hereunto set my hand.

OSCAR H. LUDEMAN.